United States Patent [19]

Schmieder et al.

[11] Patent Number: 4,758,313
[45] Date of Patent: Jul. 19, 1988

[54] PROCESS FOR THE IMPROVED SEPARATION OF SUBSTANCES HINDERING THE RECOVERY OF THE FISSIONABLE MATERIALS URANIUM AND PLUTONIUM AND FOR THE IMPROVED SEPARATION OF THE FISSIONABLE MATERIALS

[75] Inventors: Helmut Schmieder, Karlsruhe; Hans J. Bleyl, Eggenstein-Leopaldshafen; Zdenek Kolarik, Karslruhe; Klaus Ebert, Heidelberg, all of Fed. Rep. of Germany

[73] Assignee: Kernforschungszentrum Kalrsuhe GmbH, Fed. Rep. of Germany

[21] Appl. No.: 685,660

[22] Filed: Dec. 24, 1984

[30] Foreign Application Priority Data

Dec. 22, 1983 [DE] Fed. Rep. of Germany ....... 3346405

[51] Int. Cl.$^4$ .................. C25C 3/34; C01G 43/00; C01G 56/00
[52] U.S. Cl. ......................................... 204/1.5; 423/2; 423/8; 423/251
[58] Field of Search ................. 204/1.5; 423/2, 8, 251, 423/249

[56] References Cited

U.S. PATENT DOCUMENTS

| | | | |
|---|---|---|---|
| 2,908,547 | 10/1959 | Nicholls et al. | 423/8 |
| 3,616,275 | 10/1971 | Schneider | 204/1.5 |
| 3,714,324 | 1/1973 | Weech | 423/251 |
| 3,922,231 | 11/1975 | Carlin et al. | 423/2 |
| 3,949,049 | 4/1976 | Ochsenfeld et al. | 423/251 |
| 4,011,296 | 3/1977 | Ruiz et al. | 423/8 |
| 4,021,313 | 5/1977 | Hausberger et al. | 204/1.5 |
| 4,284,472 | 8/1981 | Pomares et al. | 423/249 |
| 4,528,165 | 7/1985 | Friedman | 423/2 |

OTHER PUBLICATIONS

Reactor Handbook, vol. II; Stoller, S. M. Richard, R. B.; N.Y.; Interscience Publisher, 1961, pp. 107 to 116, 154, 155, 229 to 234.

C. S. Schlea, A. S. Jennings in "Solvent Extraction Chemistry of Materials" Editor: H. A. C. McKay et al.; Macmillian London–Melbourne–Toronto, 1965 pp. 81–101.

F. R. Bruce, Proceed, of Int. Conf. Peaceful Uses of At. Energy: vol. 7, pages 100 to 112, United Nations, New York 1956.

Primary Examiner—Edward A. Miller
Attorney, Agent, or Firm—Sughrue, Mion, Zinn, Macpeak and Seas

[57] ABSTRACT

A process for the separation of substances hindering the recovery of the fissionable materials uranium and plutonium and for the separation of the fissionable materials to be recovered in a reprocessing process for spent, irradiated nuclear fuel- and/or fertile materials. A second and a third wash of the organic phase is performed for residual ruthenium separation and residual zirconium separation, and there is a repetition of the Pu stripping step with simultaneous electrolytic reduction of Pu(IV) to Pu(III). The second and third wash solutions or the aqueous phase employed for the repetition of plutonium stripping, respectively, each contains a high concentration of product uranyl nitrate. The aqueous run-off from the second and third washes and from the repetition of the Pu stripping step is indirectly fed back into the aqueous fuel solution employed in the first extraction step of the reprocessing method by first feeding these run-offs to an intermediate treatment.

16 Claims, 2 Drawing Sheets

PROCESS FOR THE IMPROVED SEPARATION OF SUBSTANCES HINDERING THE RECOVERY OF THE FISSIONABLE MATERIALS URANIUM AND PLUTONIUM AND FOR THE IMPROVED SEPARATION OF THE FISSIONABLE MATERIALS

BACKGROUND OF THE INVENTION

The present invention relates to a process for the improved separation of substances which hinder the recovery of the fissionable materials uranium and plutonium, and for the improved separation of the fissionable materials to be recovered in a reprocessing process for spent, irradiated nuclear fuel- and/or fertile materials. In the recovery process, irradiated nuclear fuel- and/or fertile materials are dissolved in strong, aqueous nitric acid to form an aqueous phase or starting feed solution containing the fissionable materials and the hindering substances, the fissionable materials are then transferred from the aqueous phase into an organic phase by an organic extraction agent solution, and thereafter the fissionable materials are separated from each other in purified form and are stripped into aqueous solutions.

The so-called Plutonium-Uranium-Reduction-Extraction Process (PUREX Process) has gained wide acceptance for the reprocessing of irradiated nuclear fuel- and/or fertile materials. This process comprises dissolving the nuclear- and/or fertile materials in strong nitric acid as described above, which selectively affects the fuel only, and then of a first extraction cycle, in which uranium and plutonium together are extracted from the aqueous nitric acid into an organic tributylphosphate(TBP)/kerosene solution and thereby are separated from the main part of the harmful substances which remain in the aqueous nitric acid. Subsequently, plutonium is separated from uranium by selectively reducing the plutonium and stripping it into an aqueous phase. The uranium remaining in the organic phase is then stripped into an aqueous phase. This ends the first extraction or purification cycle. (As used herein, an extraction or purification cycle or a cycle refers to an extraction operation into an organic extractant, one or more scrubbing or washing operations, and a stripping operation into aqueous solution.) Then, two further purification cycles each for uranium and plutonium are conducted after which uranium and plutonium are present in aqueous solutions. Until now, this process has been required in order to achieve the usual product specifications for uranium and plutonium that must be met at this time. The product specifications refer to the product purities in reference to certain fission product nuclides or other foreign nuclides.

In the following table, the required decontamination factors are presented correlated with the cooling time of the irradiated nuclear fuel material after a burn-up of 33,000 MWd/t. Decontamination factors (DF) can on the one hand obtained from the concentrations present in the solution, and they are given by the ratio of concentration before a purification step to concentration after it, or they can represent the decline in activity from before purification to after purification. In columns 3 and 4 of the table, the respective total decontamination factors ($DF_{tot}$) for uranium or plutonium are given, that is, the factors by which the concentrations of impurities in uranium or plutonium, respectively, must be reduced in order to obtain the required impurities of the uranium product or of the plutonium product, respectively, after completing the reprocessing.

TABLE
Required Decontamination Factors in Relation to the Cooling Period of the Burnout: 33000 MWd/t

| Cooling Period [Years] | Activity[1] [Ci/mol U] | $DF_{tot}$ in $U^2$ | $DF_{tot}$ in $Pu^3$ | Relevant FP-DF in $U^2$ | Relevant FP-DF in $Pu^3$ | Uranium Purification DF for $Pu^4$ (as Pu conc.) | Uranium Purification DF for $Np^5$ (as α-activity) | Plutonium-Purification DF for $U^3$ (as U conc.) | Plutonium-Purification DF for $Np^3$ (as Np conc.) |
|---|---|---|---|---|---|---|---|---|---|
| 0.5 | 475 | $4 \cdot 10^6$ | $5 \cdot 10^6$ | Zr/Nb—Ru $2.6 \cdot 10^6$ | $3.4 \cdot 10^6$ | $9 \cdot 10^5$ | 70 | 2700 | 28 |
| 1.0 | 235 | $2 \cdot 10^6$ | $2.5 \cdot 10^6$ | Zr/Nb—Ru $7.5 \cdot 10^5$ | $9.8 \cdot 10^5$ | $9 \cdot 10^5$ | 70 | 2700 | 28 |
| 3.0 | 58 | $4.9 \cdot 10^5$ | $6.1 \cdot 10^5$ | Ru $1.3 \cdot 10^5$ | $1.7 \cdot 10^5$ | $9 \cdot 10^5$ | 70 | 2700 | 28 |
| 7.0 | 24 | $2.3 \cdot 10^5$ | $2.5 \cdot 10^5$ | Ru $9.7 \cdot 10^3$ | $1.1 \cdot 10^4$ | $9 \cdot 10^5$ | 70 | 2700 | 28 |

[1]Sum of the activities of 95-Zr/Nb, 106 Ru, 137 Cs, 144 Ce
[2]Specification of the Cogema Firm, France
[3]Specification of the ALKEM Firm, Germany
[4]WAK Specification
[5]α: 15000 dpm/gU, from this Pu: 5000, Np: 10000

It is known that the different harmful substances, among which are the fission products, are removed with different rates of efficiencies under the same process conditions. The fission products zirconium/niobium and ruthenium are comparatively difficult to remove. If it is assumed that the other harmful substances are easier to remove, then it can be concluded that the fission product decontamination of uranium or of plutonium, respectively, required during the recovery process is determined almost solely by the nuclides Zr-95 and Ru-106 as well as their daughter products. The DF required for these are presented in the table in column 5 as "Relevant FP-DF". After cooling times of three years and more, the main problem of fission product separation is practically to be regarded only as the effective separation of Ru, because Zr is decomposed and all other nuclides are separated without problem under the extraction conditions of the process. The lower values for Relevant FP-DF compared to the values of $DF_{tot}$ occur because part of the residual fission product nuclides in the uranium- or plutonium-product, respectively, are more harmful and therefore require a higher specific DF. This, however, has no further effect, because they can be more easily separated. Columns 6 and 7 contain the decontamination factors for plutonium and neptunium by which the uranium must be purified. Columns 8 and 9 show the corresponding DF for uranium and neptunium for plutonium purification. It can be concluded from columns 6 to 9 that the DF for Pu and Np in uranium or for U and Np in plutonium, respectively, are not a function of the cooling time. In contrast, the required DF for the selected fission products show a significant dependence on the cooling time. While already in the first cycle of the PUREX process, decontamination factors for ruthenium are achieved which only are approximately one order of magnitude below the DF required for three years cooling time, in the known installations for reprocessing irradiated nuclear fuel materials, in the product uranium usually the required DF for Pu and Np is reached only after a total of three cycles.

SUMMARY OF THE INVENTION

An object of the present invention is to simplify the procedure for reprocessing spent nuclear fuel- and/or fertile materials.

Another object of the present invention is to reduce the number of required separation- and purification-cycles, respectively, with equal or improved effectiveness.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for the separation of substances which hinder the recovery of fissionable materials uranium and plutonium, and for separation of the fissionable materials to be recovered in a reprocessing process for spent, irradiated nuclear fuel- and/or fertile materials, in which the irradiated nuclear fuel- and/or fertile materials are dissolved in a strong, aqueous nitric acid fuel solution to form an aqueous phase containing the fissionable materials and the hindering substances, the fissionable materials are transferred from the aqueous phase into the organic phase by an organic extraction agent solution, and thereafter the fissionable materials are separated from each other in purified form and are stripped in aqueous solutions, comprising the combination of the following process steps, in the given sequence, in a single process cycle: (a) extracting the uranium and plutonium together from the strong nitric acid fuel solution into the organic extraction agent solution to form an organic phase, subsequently subjecting the organic phase to a first wash with a first aqueous wash solution which is 1 to 5 molar in nitric acid, whereby the main portion of the hindering substances are removed from the cycle in an aqueous highly radioactive waste solution; (b) subjecting the organic phase to a second wash for separating residual ruthenium with a second aqueous wash solution uranium (VI) (taken as a part of the uranium final product and henceforth denoted as having a high concentration of recycled product uranyl nitrate) which initially is about 4 molar in $HNO_3$, at an elevated temperature; (c) subjecting the organic phase to a third wash for separating residual zirconium with a third aqueous wash solution having a high concentration of recycled product uranyl nitrate, which initially is about 1 molar in $HNO_3$, at an elevated temperature; (d) separating plutonium in the organic phase from uranium by electrolytically reducing the plutonium and stripping the plutonium into an aqueous solution; (e) subjecting the organic phase resulting from step (d) to a Pu stripping step by simultaneously electrolytically reducing residual Pu(IV) in the organic phase to Pu(III) with an aqueous, nitric acid solution having a high concentration of recycled product uranyl nitrate, which is about 0.3 molar in $HNO_3$, at an elevated temperature; (f) subjecting aqueous run-offs of steps (b), (c) (e) to a treatment which converts the ruthenium and zirconium in these run-offs from an extractable form to an unextractable form; and (g) feeding the treated run-offs of step (f) to the aqueous fuel solution which is employed in step (a).

Thus, in the present invention, there is not a direct feedback of the aqueous run-offs to the aqueous fuel solution employed in step (a), but rather an indirect feedback as a result of subjecting these run-offs to treatment step (f) which therefor is an intermediate treatment.

Preferably, the treatment of step (f) is at least one of the following treatments, (1) a heat treatment at boiling temperature, (2) a denitration, (3) an addition of an aqueous solution having at least one complexing agent selected from the group oxalic acid, alkali oxalate and alkali fluoride, and (4) addition of at least one sorption agent selected from the group silica gel, titanium oxide and aluminum oxide.

Preferably, an aqueous solution having at least one complexing agent selected from the group oxalic acid, alkali oxalate and alkali fluoride is added in at least one of the process steps (b), (c) and (e) to the aqueous solution which is employed in these steps before its contact with the organic phase which is treated in these steps. This addition is especially preferred when the treatment step (f) does not employ an addition of an aqueous solution having at least one of these complexing agents.

In one preferred embodiment of the present invention, the treated aqueous run-offs from step (f) are fed to the aqueous fuel solution employed in step (a) before conducting extraction step (a). In another preferred embodiment of the present invention, the treated aqueous run-offs from step (f) are fed to the aqueous fuel solution employed in step (a) during extraction step (a).

In a further preferred embodiment of the process according to the present invention, the radioactive harmful substances ruthenium and/or zirconium are diluted in at least one of process steps (b), (c) and (e), by adding at least one salt of inactive ruthenium and/or of inactive zirconium from the group ruthenium nitrosyl nitrate, zirconium nitrate and zirconium oxinitrate to the aqueous solution employed in these steps before its contact with the organic phase.

The initial concentration of recycled uranyl nitrate in the aqueous wash solutions of steps (b) and (c) or in the aqueous stripping solution of step (e) preferably is 0.2 to 1 mol/l. The elevated temperature in steps (b), (c) and (e) each are most advantageously in the range of 40° to 60° C. The initial solutions containing complexing agents have only small complexing agent concentrations, and are advantageously $10^{-5}$ to $10^1$ molar in complexing agents. Also the additions of inactive ruthenium and/or zirconium are comparatively small, so that the initial aqueous phases in steps (b) and/or (c) and/or (e) are each about $10^{-4}$ molar in inactive Ru and/or Zr.

It is to be understood that both the foregoing general description and the following detailed description are examplary and explanatory, but are not restrictive of the invention.

BRIEF DESCRIPTION OF THE DRAWINGS

In FIGS. 1 and 2, organic streams are shown in dotted line and aqueous streams are shown in full line.

DETAILED DESCRIPTION OF THE INVENTION

Figure 1:
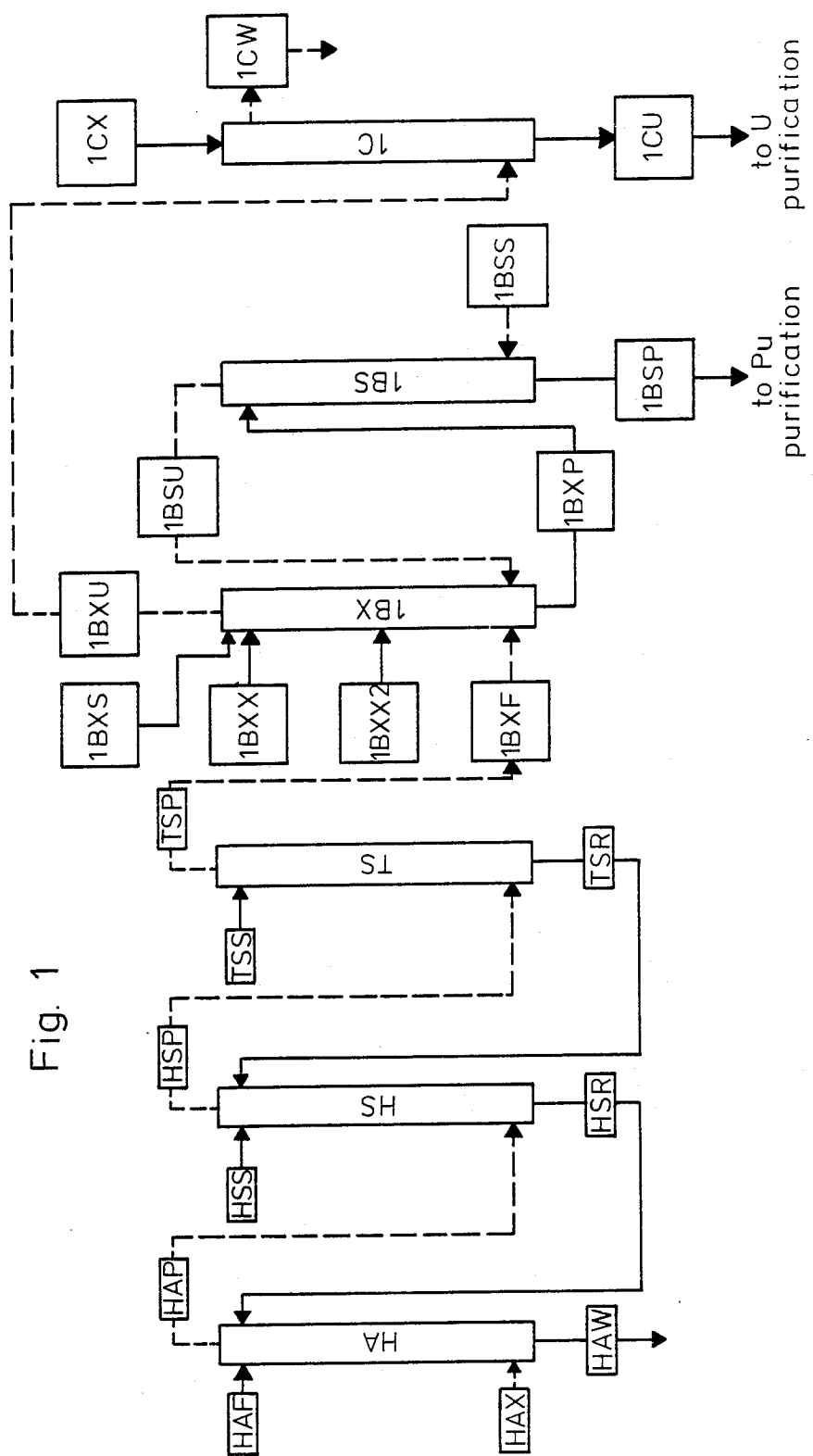
FIG. 1 is a flow diagram of a conventional reprocessing method employing the PUREX process.

The following individual measures are known for improving the zirconium- and ruthenium-decontamination factors:

1. The use of two wash steps with optimum acid concentration, whereby Zr separation is accomplished with low acid concentration and Ru separation is accomplished with high acid concentration. See Reactor Handbook, Volume II; Stoller, S. M., Richard, R. B.; N.Y.: Interscience Publisher 1961, pages 107 to 116, 154, 155, 229 to 234.

2. The use of elevated temperature in the wash extractors. See C. S. Schlea, A. S. Jennings in "Solvent Extraction Chemistry of Metals" Editor: H. A. C. McKay et al; Macmillan London-Melbourne-Toronto, 1965, pages 81 to 101.

3. Improvement of the decontamination factors through raised saturation of the extraction agent with uranium. See F. R. Bruce, Proceed. of Int. Conf. Peaceful Uses of At. Energy; Volume 7, pages 100 to 112, United Nations, New York 1956.

The above individual measures were used in different plants with the usual PUREX flow diagram. Nevertheless, only small increases of the fission product decontamination factors were obtained in comparison with a process which did away with these measures. In no case was the effect which was expected from the individual experiments achieved by the introduction of one of these measures in the PUREX process. The reason for this is certainly that the direct feedback of the low- and high acid wash flows (measure under 1.) leads to an accumulation of the extractive species of Ru and Zr in the area of the extractor HA and of the washer (extractor HS) of the PUREX process diagram of the first cycle known up to now. (See FIG. 1). By these means, the expected advantages of the individual measures in the PUREX process were not realized, and the extractable species were not transformed into unextractable form and thereby remained in the aqueous phase.

These disadvantages are avoided in the process according to the present invention. The process of the present invention contains a total of three wash steps, whereby the aqueous run-offs of the second and third wash steps are subjected to an intermediate treatment, and then are directly fed back either into the fuel solution or into the extraction column HA. In the intermediate treatment, the extractable nonhydrolyzed species of Ru and Zr are transformed into an unextractable hydrolyzed or otherwise complexed form. This is achieved either by a heat treatment at boiling temperature for at least 10 min. or by chemical measures, as, for example, denitration with formic acid at boiling temperature, addition of complexing agents, addition of sorption agents (>1 g per liter of solution), passage through a column bed of a sorption agent, or by several of these treatments.

For the separation of plutonium from uranium through electrolytic reduction of plutonium and stripping of same into an aqueous solution, in the process according to the present invention, after the usual separation process at approximately room temperature, a second Pu reduction and stripping step is conducted at an elevated temperature, for example, 60° C. In the present invention, the organic uranium flow is led from the second Pu reduction and stripping step into the stripping column of the uranium. On the one hand, then, washing-out the uranium of the aqueous Pu(III) flow resulting from the first electrolytic Pu stripping step with fresh organic extraction agent solution is no longer required. On the other hand, the organic uranium flow from the first electrolytic Pu stripping step is subjected to a second, electrolytic Pu stripping to remove residual plutonium. The aqueous run-off from this second electrolytic Pu stripping step is likewise fed to the intermediate treatment named, and then is fed back into the solvent solution, or into the extraction column HA, respectively.

In the case that no complexing agent is added in the intermediate treatment, complexing agents can be added to the aqueous, nitric acid-containing wash solutions for the second and third wash steps and for the second electrolysis step.

An additional improvement in the process of the present invention can be realized through a so-called isotope dilution, that is, by the addition of inactive ruthenium and/or inactive zirconium in the form of compounds to the aqueous wash solutions of the second and third wash steps or to the aqueous solution for the second electrolysis step, respectively, in order to increase the washing effect for the radioactive nuclides.

Referring now to the drawings, there is shown in FIG. 1 a conventional PUREX process comprising an extraction and U-Pu separation cycle, followed by 2 U purification cycles and 2 Pu purification cycles. As shown in FIG. 1, an aqueous, strong nitric acid, highly radioactive feed solution HAF containing uranium, plutonium, neptunium and possibly further actinides, and harmful or hindering substances, as, for example, radioactive fission products, activation products and inactive corrosion products is fed into the top of an extraction column HA. The aqueous HAF solution is obtained by a conventional method, that is, by dissolving a nuclear fuel- and/or fertile element in a solvent, generally hot nitric acid, removing solid matter, and adjusting metal and acid concentrations. An organic extraction agent solution HAX which preferably comprises a 30% TBP/kerosene solution is fed into the bottom of extraction column HA in countercurrent to HAF. In extraction column HA, actinides, such as U, Pu, etc. are transferred from the aqueous phase of HAF into the organic phase of HAX, whereby comparatively small amounts of harmful substances are also coextracted into the organic phase.

An aqueous, nitric acid, highly radioactive waste solution HAW, leaves column HA and contains the main portion of the harmful substances and traces of plutonium and uranium.

An organic uranium-plutonium product HAP flows out of extraction column HA and is sent to a first wash column HS in which there is a counter-current wash of the HAP with a first wash solution HSS which is an aqueous, nitric acid solution, which generally is about 1 to 5 molar in HNO₃. An aqueous run-off HSR of the first wash step leaves column HS and is fed back into the extraction column HA. The first wash column HS can be integrated with the extraction column HA by locating column HS above column HA.

An organic uranium-plutonium flow HSP leaves wash column HS and is introduced into a second wash column TS in which there is a counter-current wash of the HSP with a second wash solution TSS which is an aqueous, nitric acid solution, which is about 1 molar $HNO_3$. An aqueous run-off TSR leaves second wash column TS and is fed back into the first wash column HS.

An organic uranium-plutonium product TSP flows out of the second wash column TS and is sent to a Pu reduction stripping or uranium-plutonium separation column IBX. The organic uranium-plutonium flow which enters column IBX is designated IBXF. In column IBX, there is a reduction of PU(IV) to Pu(III) and an extraction of the Pu(III) in countercurrent from the organic phase into an aqueous phase, which contains dilute $HNO_3$, about 0.2 m/l, and $N_2H_5^+$-ions stabilizes the valence state of Pu(III). The reduction of Pu(IV) to Pu(III) in column IBX can be performed either through the addition of a U(IV) solution, in which case the aqueous solutions fed into the IBX column are designated IBXX and can differ in the concentrations of U(IV) and nitric acid and IBXX2, or through electrolysis in which case the aqueous phase fed into the IBX column is designated IBXS.

An organic uranium effluent IBXU containing U(VI) flows out of column IBX and is fed into a uranium stripping column IC.

An aqueous plutonium effluent IBXP containing PU(III) flows out of column IBX and is sent to a wash column IBS where it is washed with a fresh, organic extraction agent solution IBSS. In column IBS, there is a counter-current wash of IBXP with organic solution IBSS, which can be, for example, a TBP-kerosene solution. An organic run-off IBSU containing residual uranium leaves the top of column IBS and is fed back into the bottom of column IBX.

An aqueous Pu(III) stream IBSP leaves column IBS and contains $N_2H_5^+$-ions, and this stream must be fed to further Pu purification cycles known as the second and third Pu purifications, which are not shown in the drawing.

In column IC, there is a counter-current stripping of uranium from the organic phase of stream IBXU into an aqueous phase at 60° C. by employing a highly dilute $HNO_3$ stripping solution ICX which is fed into the top of column IC.

An aqueous uranium flow ICU leaves stripping column IC and must be fed to further U purification cycles, known as the second and third U purifications, which are not shown in the drawing.

An organic waste solution ICW leaves stripping column IC and is fed further to an extraction agent wash, not shown in the drawing.

The first cycle ends with the treatments in the IBS organic wash column and IC uranium stripping column.

Figure 2:
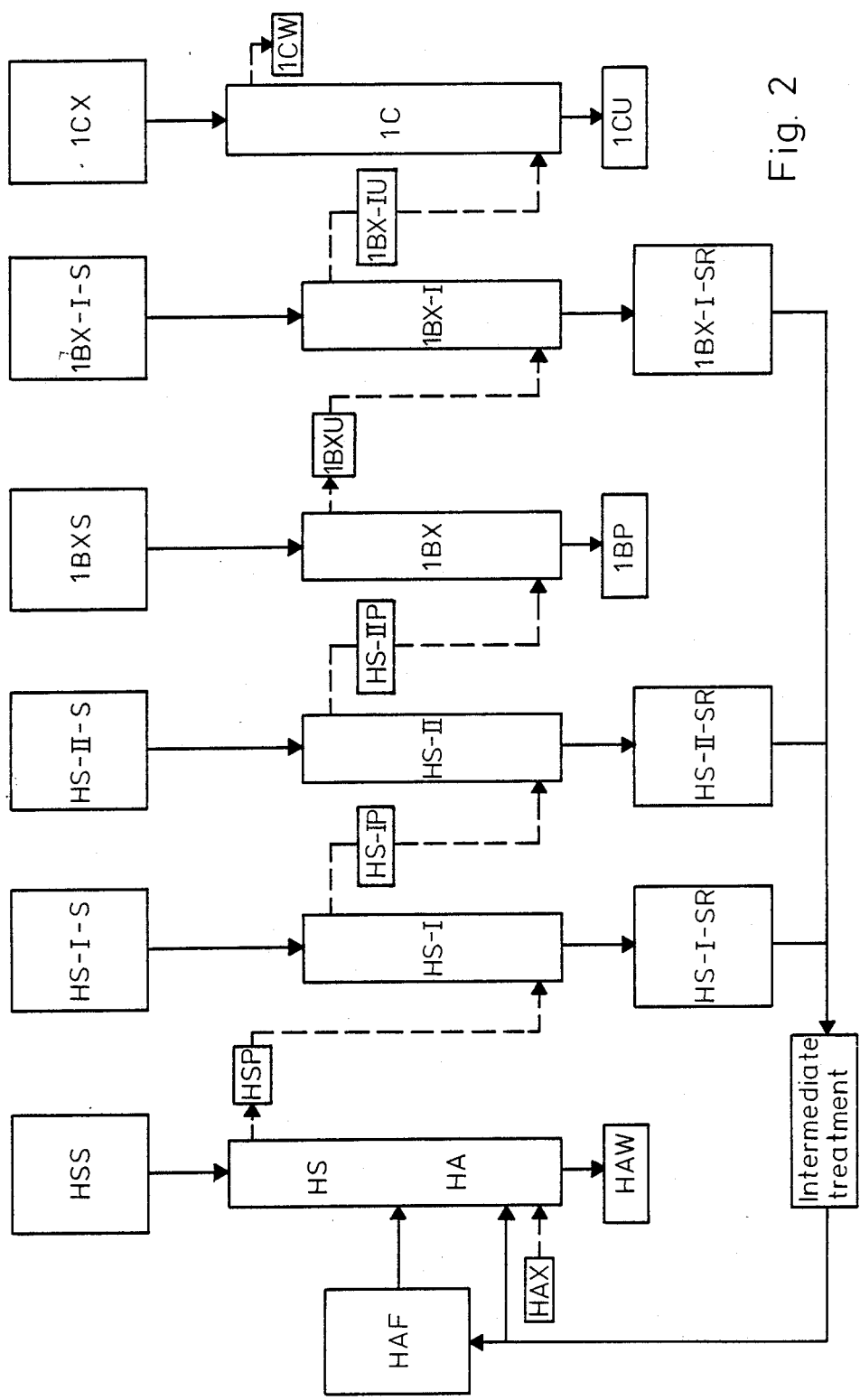
FIG. 2 is a flow diagram of one embodiment of a reprocessing method performed in accordance with the present invention.

Turning now to FIG. 2, there is shown a flow diagram according to the present invention in which there is only one extraction or purification cycle. As shown in FIG. 2, an aqueous, strong nitric acid, highly radioactive feed solution HAF containing uranium, plutonium, neptunium and possibly further actinides, and harmful or hindering substances, as, for example, radioactive fission products, activation products and inactive corrosion products, is fed into the top of an extraction section HA of a combined extraction-wash column HA/HS. The aqueous HAF solution is obtained in a conventional manner, that is, by dissolving a nuclear fuel- /or fertile element in a solvent, generally hot nitric acid, removing solid matter, and adjusting metal and acid-concentration. An organic extraction agent solution HAX, which preferably comprises a 30% TBP/kerosene solution, is fed into the bottom of extractor HA/HS in countercurrent to HAF. In extraction column HA/HS, actinides are extracted from the aqueous phase into the organic phase, and the resulting organic, charged phase which rises upwardly is washed in wash section HS with a first wash solution HSS which is an aqueous nitric acid solution HSS, which is about 1 molar in $HNO_3$, and which is fed into the top of HA/HS column. An aqueous, nitric acid, highly radioactive waste solution HAW leaves the bottom of column HA/HS and contains the main portion of the harmful substances and traces of plutonium and uranium.

An organic uranium-plutonium product HSP flows out of column HA/HS and is sent to a column HS-I in which there is a counter-current second wash of stream HSP with an aqueous second wash solution HS-I-S which is about 4 molar in $HNO_3$ and which contains a uranium concentration of about 100 g/l. The uranium for this wash solution is taken as a part of the final uranium product ICU. The operating temperature in wash column HS-I is 60° C., and there is a separation of the residual ruthenium in wash column HS-I. An aqueous, nitric acid run-off HS-I-SR leaves column HS-I, carrying with it the residual ruthenium and small amounts of uranium and plutonium. Run-off HS-I-SR is fed into an intermediate treatment step.

An organic U-Pu stream HS-IP flows out of wash column HS-I and is fed into a wash column HS-II in which there is a counter-current third wash of stream HS-IP with an aqueous third wash solution HS-II-S which is about 1 molar $HNO_3$, and which contains a uranium concentration of about 100 g/l. The uranium for this wash solution is also taken as a part of the final uranium product ICU. The operating temperature in wash column HS-II is 60° C., and there is a separation of the residual zirconium in wash column HS-II.

An aqueous, nitric acid run-off HS-II-SR leaves column HS-II, carrying with it the residual zirconium and small amounts of uranium and plutonium. Run-off HS-II-R is fed into the intermediate treatment step.

An organic U-Pu stream HS-II-P flows out of wash column HS-II and is sent to an electrolysis column IBX for the electrolytic reduction of Pu(IV) to Pu(III) and Pu(III) stripping from the organic phase into the aqueous phase at room temperature. An aqueous phase IBXS for the stripping of Pu(III) is fed into column IBX and is 0.2 molar in $HNO_3$.

An aqueous solution IBP leaves column IBX and contains plutonium and a portion of uranium product, and is a so-called "Master-Mix" (concentration ratio U/Pu≧1) which can be used for the refabrication of nuclear fuel- and/or fertile materials usable in the future, because solution IBP is substantially free from fission products, etc. The Np that is almost completely transferred into solution IBP with the plutonium and uranium, if required, can be separated from IBP with, for example, an ion-exchange step.

An organic U(VI) stream IBXU flows out of column IBX and is fed into an electrolysis column IBX-I. Column IBX-I is a second column for the electrolytic reduction of the residual Pu(IV) and for stripping the residual Pu(III) from the organic phase IBXU into an aqueous phase at 60° C. An aqueous phase IBX-I-S for stripping residual Pu(III) contains about 0.3 molar in HNO$_3$ and about 100 g/l uranium, and is fed into column IBX-I. An aqueous, nitric acid run-off IBX-I-SR leaves column IBX-I, carrying with it the residual Pu and small amounts of uranium, and is fed into the intermediate treatment step.

An organic uranium stream IBX-IU flows out of column IBX-I and is fed to a column IC for the countercurrent stripping of U from the organic phase practically free of Pu into an aqueous phase at 60° C. with highly dilute HNO$_3$. An aqueous phase ICX for the stripping of uranium is about 0.01 molar in HNO$_3$ and is fed into column IC. An aqueous, practically pure uranium product solution ICU leaves column IC. An organic waste solution ICW also leaves column IC and is fed further to an extraction agent wash.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE

In agreement with FIG. 2 and the corresponding key, the respective solutions to be introduced are used with the following flows, referring to the flow of the HAF feed solution (flow=1):

|         |     |
|---------|-----|
| HAF     | 1   |
| HAX     | 3   |
| HSS     | 0.2 |
| HS-I-S  | 0.3 |
| HS-II-S | 0.3 |
| IBXS    | 1   |
| IBX-I-S | 0.6 |
| ICX     | 3   |

The solutions HS-I-S, HS-II-S and IBX-I-S each contained 100 g uranium/l. The intermediate treatment of the run-off from the HS-I column, from the HS-II column and from the IBX-I column comprised a boiling reflux of the combined run-offs at a nitric acid concentration of about 0.5 molar. The extractable nonhydrolyzed ruthenium in the form of its compound and the extractable nonhydrolyzed zirconium in the form of its compound were hereby transformed to 80 to 99% into the corresponding hydrolyzed unextractable species. The run-off from the HS-II column produced an additional DF for zirconium of >10. While the plutonium separation in the IBX electrolysis column produced a DF of 2000 to 10000 for the organic, uranium-containing flow, in the IBX-I column for the uranium flow a further plutonium separation was conducted, which was characterized by an additional DF of 100 to 500. These values apply for pulse columns. The required purity of the uranium end product was hereby achieved. The plutonium-containing end product IBP (Master-Mix) contained the 5- to 50-fold amount of uranium. If it is desired to further reduce the uranium amount in this end product, that is, if the uranium were to be further separated, the usual IBS column can be operated between the IBX and the IBX-I column.

It will be understood that the above description of the present invention is susceptible to various modifications, changes and adaptations, and the same are intended to be comprehended within the meaning and range of equivalents of the appended claims.

What is claimed is:

1. Process for separating substances which hinder the recovery of the fissionable materials uranium and plutonium and for the separation of the fissionable materials to be recovered in a reprocessing process for spent, irradiated nuclear fuel- and/or fertile materials, in which irradiated nuclear fuel- and/or fertile materials are dissolved in a strong, aqueous nitric acid solvent to form an aqueous phase containing the fissionable materials, the fissionable materials are transferred from the aqueous phase into an organic phase by an organic extraction agent solution, and thereafter the fissionable materials are separated from each other in purified form and are stripped into aqeuous solutions, comprising the combination of the following process steps, in the given sequence, in a single process cycle:

(a) extracting the uranium and plutonium together from the strong, aqueous nitric acid fuel solution into the organic extraction agent solution to form an organic phase, subsequently subjecting the organic phase to a first wash with a first aqueous wash solution which is 1 to 5 molar in nitric acid, whereby the main portion of the substances which hinder the recovery of the fissionable material are removed from the cycle in an aqueous, highly radioactive waste solution;

(b) subjecting the organic phase to a second wash for separating residual ruthenium with a second aqeuous wash solution having a high concentration of recycled product uranyl nitrate, which is about 4 molar in HNO$_3$, at an elevated temperature;

(c) subjecting the organic phase to a third wash for separating residual zirconium by a third aqueous wash solution having a high concentration of recycled product uranyl nitrate, which is about 1 molar in HNO$_3$, at an elevated temperature;

(d) separating plutonium in the organic phase from the uranium by electrolytically reducing the plutonium and stripping the plutonium into an aqueous solution, whereby a residual quantity of PU(IV) remains in the organic phase after the stripping;

(e) subjecting the organic phase resulting from step (d) to a Pu stripping step by simultaneously electrolytically reducing resdiual Pu(IV) in the organic phase to PU(III) by an aqueous, nitric acid stripping solution having a high concentration of recycled product uranyl nitride, which is about 0.3 molar in HNO$_3$, at an elevated temperature;

(f) subjecting aqueous run-offs of steps (b), (c) and (e) to a treatment which converts the ruthenium and zirconium in these run-offs from an extractable form into an inextractable form; and (g) feeding the treated run-offs of step (f) to the aqeuous fuel solution which is employed in step (a).

2. Process according to claim 1, wherein the treatment of step (f) is at least one of the following treatments, (a) a heat treatment at boiling temperature, (b) a denitration, (c) an addition of an aqueous solution having at least one complexing agent selected from the group oxalic acid, alkali oxalate and alkali fluoride, and (d) an addition of at least one sorption agent selected from the group silica gel, titanium oxide and aluminum oxide.

3. Process according to claim 1, wherein an aqueous solution having at least one complexing agent selected from the group oxalic acid, alkali oxalate and alkali fluoride is added in at least one of the process steps (b), (c) and (e) to the aqueous solution which is employed in these steps before its contact with the organic phase.

4. Process according to claim 1, wherein the treated run-off of step (f) is fed to the aqueous fuel solution before the aqueous fuel solution is fed to extraction step (a).

5. Process according to claim 2, wherein the treated run-off of step (f) is fed to the aqueous fuel solution before the aqueous fuel solution is fed to extraction step (a).

6. Process according to claim 3, wherein the treated run-off of step (f) is fed to the aqueous fuel solution before the aqueous fuel solution is fed to extraction step (a).

7. Process according to claim 1, wherein the treated run-off of step (f) is fed to the aqueous fuel solution during extraction step (a).

8. Process according to claim 2, wherein the treated run-off of step (f) is fed to the aqueous fuel solution during extraction step (a).

9. Process according to claim 3, wherein the treated run-off of step (f) is fed to the aqueous fuel solution during the extraction step (a).

10. Process according to claim 1, wherein the radioactive harmful substances ruthenium and/or zirconium are diluted in at least one of process steps (b), (c) and (e), by adding at least one salt of inactive ruthenium and/or of inactive zirconium from the group ruthenium nitrosyl nitrate, zirconium nitrate and zirconium oxinitrate to the aqueous phase before its contact with the organic phase.

11. Process according to claim 1, wherein the initial concentration of recycled uranyl nitrate in the aqueous wash solutions of steps (b) and (c) or in the aqueous stripping solution of step (e) amounts to 0.2 to 1 mol/l.

12. Process according to claim 1, wherein the initial temperature in steps (b), (c) and (e) each are in the range of 40° C. to 60° C.

13. Process according to claim 2, wherein the initial solution containing complexing agents is $10^{-5}$ to $10^{-1}$ molar in complexing agents.

14. Process according to claim 3, wherein the initial solution containing complexing agents is $10^{-5}$ to $10^{-1}$ molar complexing agents.

15. Process according to claim 10, wherein the initial aqueous phases in steps (b) and/or (c) and/or (e) are each $10^{-4}$ molar in inactive Ru and/or Zr.

16. Process according to claim 3, wherein the treatment of step (f) is at least one of following treatments, (a) a heat treatment at boiling temperature, (b) a denitration, and (c) an addition of at least one sorption agent selected from the group silica gel, titanium oxide and aluminum oxide.

* * * * *